United States Patent
Mellet et al.

(10) Patent No.: US 8,567,273 B2
(45) Date of Patent: Oct. 29, 2013

(54) GEAR TRANSFER DUAL CLUTCH TRANSMISSION

(75) Inventors: Edward W. Mellet, Rochester Hills, MI (US); James B. Borgerson, Clarkston, MI (US)

(73) Assignee: GM Global Technology Operations LLC, Detroit, MI (US)

(*) Notice: Subject to any disclaimer, the term of this patent is extended or adjusted under 35 U.S.C. 154(b) by 512 days.

(21) Appl. No.: 12/815,047

(22) Filed: Jun. 14, 2010

(65) Prior Publication Data

US 2011/0306456 A1    Dec. 15, 2011

(51) Int. Cl.
*F16H 3/08*    (2006.01)

(52) U.S. Cl.
USPC .................. 74/331; 74/329; 74/340

(58) Field of Classification Search
USPC ........... 74/330, 331, 473.11, 329, 337.5, 333, 74/340; 475/303
See application file for complete search history.

(56) References Cited

U.S. PATENT DOCUMENTS

| | | | |
|---|---|---|---|
| 3,654,822 A * | 4/1972 | Singer et al. ............... | 475/218 |
| 6,092,432 A * | 7/2000 | Klaricic ...................... | 74/325 |
| 6,176,146 B1 * | 1/2001 | Ore .............................. | 74/331 |
| 6,427,549 B1 * | 8/2002 | Bowen ......................... | 74/331 |
| 6,460,425 B1 * | 10/2002 | Bowen ........................ | 74/331 |
| 6,752,736 B1 * | 6/2004 | Lee et al. .................... | 475/275 |
| 6,767,307 B1 * | 7/2004 | Lee et al. .................... | 475/276 |
| 7,204,166 B2 * | 4/2007 | Gochenour ................. | 74/340 |
| 7,437,963 B2 * | 10/2008 | Haka et al. .................. | 74/329 |
| 7,601,095 B2 * | 10/2009 | Hasegawa et al. .......... | 477/180 |
| 7,669,497 B2 * | 3/2010 | Borgerson et al. .......... | 74/340 |
| 7,963,191 B2 * | 6/2011 | Holmes ....................... | 74/661 |
| 8,220,352 B2 * | 7/2012 | Ross et al. .................. | 74/330 |
| 2010/0132492 A1 * | 6/2010 | Holmes ....................... | 74/331 |
| 2010/0186549 A1 * | 7/2010 | Ross ........................... | 74/665 D |
| 2011/0306456 A1 * | 12/2011 | Mellet et al. ................ | 475/198 |

\* cited by examiner

*Primary Examiner* — Justin Krause
*Assistant Examiner* — Alexander Vu (57) ABSTRACT

A dual clutch transmission having improved packaging and reduced spin losses provides a five, six or seven forward speeds and reverse. An input shaft includes two or three gears which are in constant mesh with and directly drive associated gears freely disposed on a pair of parallel quills. Synchronizer clutches associated with these driven gears selectively synchronize and connect the gears to the quills which are, in turn, connected to countershafts residing within the quills. Additional gears which are in constant mesh with a pair of ring (output) gears are synchronized and connected to the countershafts by additional synchronizer clutches. Activation of two synchronizer clutches and one input clutch provides a selected gear ratio and transfers torque from the input shaft to the output ring gears.

17 Claims, 3 Drawing Sheets

GEAR TRANSFER DUAL CLUTCH TRANSMISSION

FIELD

The present disclosure relates to dual clutch transmissions for motor vehicles and more particularly to dual clutch transmissions having a compact design and which provide five, six or seven forward speeds or gears.

BACKGROUND

The statements in this section merely provide background information related to the present disclosure and may or may not constitute prior art.

Dual clutch transmissions are a relatively recent addition to the stable of motor vehicle transmissions which previously included manual, continuously variable and automatic transmissions. Dual clutch transmissions or DCT's as they are now commonly known, combine good fuel economy with rapidly executed shifts. From a performance standpoint, therefore, they closely duplicate the feel and operation of a conventional mechanical transmission. Additionally, they may be configured to operate as an essentially automatic or manual transmission and thus exhibit exceptional versatility.

Structurally, dual clutch transmissions typically include an input shaft which drives a pair of mutually exclusively engaged input clutches. The input clutches drive a pair of countershafts which each include a plurality of gears freely rotatably disposed on the countershafts and associated synchronizer clutches. The pluralities of gears are in constant mesh with gears secured to an output shaft. Activation of a synchronizer clutch synchronizes and couples a selected gear to its countershaft. Then, the input clutch associated with that countershaft is engaged to transmit torque from the input shaft to the output shaft. Because clutches, gears and synchronizers are disposed or stacked along the countershafts, the axial length of dual clutch transmissions can create packaging issues, particularly in smaller vehicles.

While there are various ways to classify or categorize dual clutch transmissions, one approach to classification relates to the type of clutch utilized in the transmission: wet or dry. A wet dual clutch transmission contains lubricating transmission fluid not only in the gear and synchronizer section but also in the input clutches. A dry dual clutch transmission, of course, includes transmission fluid in the gear and synchronizer section but not in the clutches. While wet dual clutch transmissions offer slightly better durability and longer clutch life because of the cooling provided by the transmission fluid, they exhibit higher spin losses. Moreover, the incorporation of a lubrication pump which provides pressurized lubricating and cooling fluid further affects overall efficiency. Accordingly, wet dual clutch transmissions, all other parameters being equal, typically exhibit slightly lower fuel economy than dry dual clutch transmissions.

From the foregoing, it is apparent that improvements addressing both packaging and efficiency issues of dual clutch transmissions are both desirable and possible. The present invention is so directed.

SUMMARY

The present invention provides a five, six or seven speed dual clutch transmission having improved packaging and reduced spin losses. An input shaft includes and directly drives two or three gears which are in constant mesh with and directly drive associated gears freely disposed on a pair of parallel quills. Synchronizer clutches associated with these driven gears selectively synchronize and connect the gears to the quills which are, in turn, connected to countershafts residing within the quills by a pair of input clutches. Additional gears which are in constant mesh with a pair of ring (output) gears are synchronized and connected to the countershafts by additional synchronizer clutches. Activation of two synchronizer clutches and one input clutch provides a selected gear ratio and transfers torque from the input shaft to the output ring gears. The output gears may be a portion of a differential assembly.

Thus it is an aspect of the present invention to provide a wet dual clutch transmission.

It is a further aspect of the present invention to provide a five speed wet dual clutch transmission.

It is a still further aspect of the present invention to provide six speed wet dual clutch transmission.

It is a still further aspect of the present invention to provide a seven speed wet dual clutch transmission.

It is a still further aspect of the present invention to provide a wet dual clutch transmission having an input shaft that directly drives two or three input gears.

It is a still further aspect of the present invention to provide a wet dual clutch transmission having reduced spin losses.

It is a still further aspect of the present invention to provide a compact, wet dual clutch transmission.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

It will be appreciated that in all of the drawing Figures, certain components, for example, the output gears, the differential assembly and the output shafts or axles have been rotated out of position or gear sizes or shaft spacings have been altered in order to illustrate the components, their locations and interconnections more clearly.

DETAILED DESCRIPTION

The following description is merely exemplary in nature and is not intended to limit the present disclosure, application, or uses.

Figure 1:
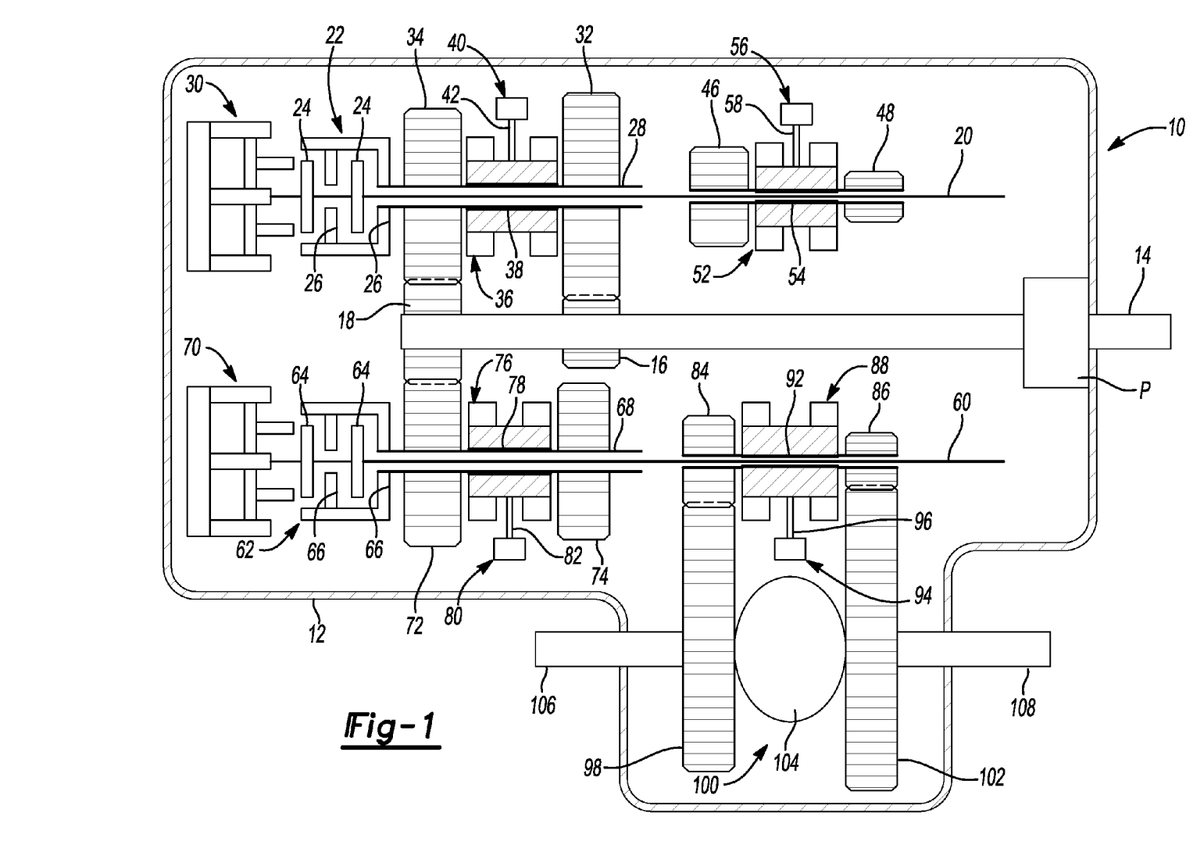
FIG. 1 is a diagrammatic view of a first embodiment of a five speed dual clutch transmission according to the present invention.

With reference to FIG. 1, a five speed dual clutch transmission according to the present invention is illustrated and generally designated by the reference number 10. The five speed dual clutch transmission 10 includes a housing 12 having various bores, openings, flanges and features that receive, locate, support and protect the components of the transmission 10. The housing 12 rotatably supports an input shaft 14 which includes a first, smaller input drive gear 16 and a second, larger input drive gear 18. It should be appreciated that the terms "smaller" and "larger" with reference to gear sizes are utilized herein only in the most relative and general sense and primarily for the purpose of locating or identifying the gears in the respective drawing Figures. Accordingly, it should be understood that the actual gear sizes, and their relative sizes, may vary from such descriptions in order to achieve certain or specific gear ratios and/or speed changes. A hydraulic pump P is secured to the housing 12, driven by the input shaft 14 and supplies pressurized hydraulic or transmission fluid to various components of the transmission 10.

Also rotatably supported in the housing 12 is a first layshaft or countershaft 20 associated with the odd numbered gears: first, third and fifth and a second layshaft or countershaft 60 associated with the even numbered gears: second and fourth and reverse. The first countershaft 20 and the second countershaft 60 are parallel to and spaced from the input shaft 14. At one end of the first countershaft 20 is a first, wet input clutch assembly 22 having a first plurality of clutch plates or discs 24 coupled to the first countershaft 20 for rotation therewith. Interleaved with the first plurality of clutch plates or discs 24 is a second plurality of clutch plates or discs 26 that are coupled to and rotate with a first quill or drive tube 28. The first wet clutch assembly 22 also includes a first actuator 30 which may be a hydraulic, electric or pneumatic device or mechanism which selectively compresses and relaxes pressure on the clutch plates or discs 24 and 26 to selectively transfer torque from the first quill or drive tube 28 to the first countershaft 20.

Freely rotatably disposed on the first quill or drive tube 28 is a first, larger driven gear 32 in constant mesh with the first, smaller input drive gear 16 and a second, smaller driven gear 34 in constant mesh with the second, larger input gear 18. Disposed between the first, larger driven gear 32 and the second, smaller driven gear 34 is a first double synchronizer clutch assembly 36. The first synchronizer clutch assembly 36 is rotationally coupled to the first quill or drive tube 28 by a first interengaging male and female spline set 38 and is free to translate axially along the first quill or drive tube 28. A first shift actuator assembly 40 which may be either hydraulic, electric or pneumatic, includes an output member and shift fork assembly 42 that engages and bi-directionally translates the first synchronizer clutch 36. When translated to the right or left from a neutral center position, the first synchronizer clutch assembly 36 (and the three other synchronizer clutch assemblies identified and described below) first synchronizes the speed of the adjacent gear, either the gear 32 to the right or the gear 34 to the left, and then positively couples the synchronized gear to the associated quill or drive tube, such as the first quill or drive tube 28.

Freely rotatably disposed on the first countershaft 20 is a third, larger drive gear 46 and a fourth, smaller drive gear 48 axially spaced from the third drive gear 46. Disposed between the third, larger drive gear 46 and the fourth, smaller drive gear 48 is a second double synchronizer clutch assembly 52. The second synchronizer clutch assembly 52 is rotationally coupled to the first countershaft 20 by a second interengaging male and female spline set 54 and is free to translate axially along the first countershaft 20. A second shift actuator assembly 56 which may be either hydraulic, electric or pneumatic, includes an output member and shift fork assembly 58 that engages and bi-directionally translates the second synchronizer clutch assembly 52.

At one end of the second countershaft 60 is a second, wet input clutch assembly 62 having a first plurality of clutch plates or discs 64 coupled to the second countershaft 60 for rotation therewith. Interleaved with the first plurality of clutch plates or discs 64 is a second plurality of clutch plates or discs 66 that are coupled to and rotate with a second quill or drive tube 68. The second wet input clutch assembly 62 also includes a second actuator 70 which may be a hydraulic, electric or pneumatic device or mechanism which selectively compresses and relaxes pressure on the clutch plates or discs 64 and 66 to selectively transfer torque from the second quill or drive tube 68 to the second countershaft 60.

Freely rotatably disposed on the second quill or drive tube 68 is a fifth, driven gear 72 in constant mesh with the second, larger input drive gear 18 and a sixth, driven gear 74 in constant mesh with the first, larger driven gear 32. Disposed between the fifth, driven gear 72 and the sixth, driven gear 74 is a third double synchronizer clutch assembly 76. The third synchronizer clutch assembly 76 is rotationally coupled to the second quill or drive tube 68 by a third interengaging male and female spline set 78 and is free to translate axially along the second quill or drive tube 68. A third shift actuator assembly 80 which may be either hydraulic, electric or pneumatic, includes an output member and shift fork assembly 82 that engages and bi-directionally translates the third synchronizer clutch assembly 76.

Freely rotatably disposed on the second countershaft 60 is a seventh, larger drive gear 84 and an eighth, smaller drive gear 86 axially spaced from the seventh drive gear 84. Disposed between the seventh, larger drive gear 84 and the eighth, smaller drive gear 86 is a fourth double synchronizer clutch assembly 88. The fourth synchronizer clutch 88 is rotationally coupled to the second countershaft 60 by a fourth interengaging male and female spline set 92 and is free to translate axially along the second countershaft 60. A fourth shift actuator assembly 94 which may be either hydraulic, electric or pneumatic, includes an output member and shift fork assembly 96 that engages and bi-directionally translates the fourth synchronizer clutch assembly 88.

The third, larger drive gear 46 and the seventh, larger drive gear 84 both are in constant mesh with and drive a first output or ring gear 98 that is associated with and is an input member to a conventional differential assembly 100. Similarly, the fourth, smaller drive gear 48 and the eighth, smaller driven gear 86 both are in constant mesh with and drive a second output or ring gear 102 that is also associated with and is an input member to the differential assembly 100. The differential assembly preferably includes a caged, four bevel gear assembly 104. Two side bevel gears of the bevel gear assembly 104 are coupled to a respective pair of axles or output shafts 106 and 108

In the embodiment illustrated in FIG. 1, on the first countershaft 20 and the first quill or drive tube 28, the first, larger driven gear 32 is associated and active with first gear and reverse, the second, smaller driven gear 34 is associated and active with third and fifth gears and on the first countershaft 20, the third, larger drive gear 46 is associated and active with fifth gear and the fourth, smaller drive gear 48 is associated and active with first and third gears. On the second countershaft 60 and the second quill or drive tube 68, the fifth, driven gear 72 is associated and active with second and fourth gears, the sixth, driven gear 74 is associated and active with reverse and on the second countershaft 60, the seventh, larger drive gear 84 is associated and active with fourth gear and the eighth, smaller drive gear 86 is associated and active with second gear and reverse.

From the foregoing, it should be apparent that to engage any given gear ratio or speed, it is necessary to activate two of the double synchronizer clutch assemblies 36, 52, 76 and 88 and engage two of the driven or drive gears 32, 34, 46, 48, 72, 74, 84 and 86. For example, to engage first gear, the first double synchronizer clutch assembly 36 is translated to the right to synchronize and connect the first, driven gear 32 to the first quill or drive tube 28 and the second double synchronizer clutch assembly 52 is translated to the right to synchronize and connect the fourth, smaller drive gear 48 to the first countershaft 20. The first input clutch assembly 22 may then be engaged to transfer drive torque from the input shaft 14, through the gears 16, 32 and 48 to the output gear 102, the differential assembly 100 and the axles or output shafts 104 and 106. To engage second gear, the third double synchronizer clutch assembly 76 is translated to the left to synchronize and connect the fifth, driven gear 72 to the second quill or drive tube 68 and the fourth double synchronizer clutch assembly 88 is translated to the right to synchronize and connect the eighth, drive gear 86 to the second countershaft 60. The second input clutch assembly 62 may then be engaged to transfer drive torque from the input shaft 14, through the gears 18, 72 and 86 to the output gear 102, the differential assembly 100 and the axles or output shafts 104 and 106.

Third gear is engaged in a manner similar to the manner in which first gear is engaged except that the first double synchronizer clutch assembly 36 is translated to the left to connect the second, driven gear 34 to the first quill or drive tube 28. The first input clutch assembly 22 is then engaged to transfer drive torque from the input shaft 14, through the gears 18, 34 and 48 to the output gear 102, the differential assembly 100 and the axles or output shafts 104 and 106. Fourth gear is engaged in a manner similar to the manner in which second gear is engaged except that the fourth double synchronizer clutch assembly 88 is translated to the left to connect the seventh, drive gear 84 to the second countershaft 60. The second input clutch assembly 62 is then engaged to transfer drive torque from the input shaft 14, through the gears 18, 72 and 84 to the output gear 98, the differential assembly 100 and the axles or output shafts 104 and 106. Fifth gear is achieved by translating the first synchronizer clutch assembly 36 to the left to engage the second, driven gear 34 and connect it to the first quill or drive tube 28 and translating the second synchronizer clutch assembly 52 to the left to engage the third, drive gear 46 and connect it to the first countershaft 20. The first input clutch assembly 22 is then engaged to transfer drive torque from the input shaft 14, through the gears 18, 34 and 46 to the output gear 98, the differential assembly 100 and the axles or output shafts 104 and 106.

Reverse is achieved by translating the third synchronizer clutch assembly 76 to the right to engage the sixth, driven gear 74 and connect it to the second quill or drive tube 68 and translating the fourth synchronizer clutch assembly 88 to the right to engage the eighth, drive gear 86 and connect it to the second countershaft 60. The second input clutch assembly 62 is then engaged to transfer drive torque from the input shaft 14, through the gears 16, 32, 74 and 86 to the output gear 102, the differential assembly 100 and the axles or output shafts 104 and 106. The direction reversal necessary for reverse is achieved by engagement of the first, driven gear 32 and the sixth, driven gear 74, as noted above.

A second embodiment of a five speed dual clutch transmission according to the present invention exists. It is essentially the same structurally and differs only in the operational configuration or layout of the gears which provide certain speeds or gear ratios. Specifically, the fourth, drive gear 48, instead of being operational and providing first and third gears (in combination with the gears 32 and 34 on the first quill or drive tube 28), it is operational and only provides first gear in combination with the first, driven gear 32. Correspondingly, the third, drive gear 46, instead of being operational and providing only fifth gear (in combination with the second, driven gear 34 on the first quill or drive tube 28), it is operational and provides third and fifth gears in combination with the first, driven gear 32 and the second, driven gear 34, respectively.

Thus, in operation, the second embodiment of the dual clutch transmission 10 provides first gear by translating the first double synchronizer clutch assembly 36 to the right to synchronize and connect the first, driven gear 32 to the first quill or drive tube 28 and translating the second double synchronizer clutch assembly 52 to the right to synchronize and connect the third, drive gear 48 to the first countershaft 20. The first input clutch assembly 22 is then engaged to transfer drive torque from the input shaft 14 to the output gear 102 and the differential assembly 100. Because the differences in configuration and layout between the first and second embodiments only involve gears on the first countershaft 20, second gear in the second embodiment is the same as second gear in the first embodiment, namely, the third double synchronizer clutch assembly 76 is translated to the left to synchronize and connect the fifth, driven gear 72 to the second quill or drive tube 68 and the fourth double synchronizer clutch assembly 88 is translated to the right to synchronize and connect the eighth, drive gear 86 to the second countershaft 60. The second input clutch assembly 62 is then engaged.

Third gear is engaged by translating the first double synchronizer clutch assembly 36 to the right to engage and connect the first, driven gear 32 to the first quill or drive tube 28 and the second double synchronizer clutch assembly 52 is translated to the left to engage and connect the third, drive gear 46 to the first countershaft 20. The first input clutch assembly 22 is then engaged to transfer drive torque from the input shaft 14 to the output gear 98 and the differential assembly 100.

Once again, because the differences in configuration and layout between the first and second embodiments only involve gears on the first countershaft 20, fourth gear in the second embodiment is the same as fourth gear in the first embodiment, namely, the third synchronizer clutch assembly 76 is translated to the left to engage and connect the fifth, driven gear 72 to the second quill or drive member 68 and the fourth double synchronizer clutch assembly 88 is translated to the left to connect the seventh, drive gear 84 to the second countershaft 60. The second input clutch assembly 62 is then engaged to transfer drive torque from the input shaft 14 to the output gear 98, the differential assembly 100.

Fifth gear is achieved by translating the first synchronizer clutch assembly 36 to the left to engage the second, driven gear 34 and connect it to the first quill or drive tube 28 and translating the second synchronizer clutch assembly 52 to the left to engage the third, drive gear 46 and connect it to the first countershaft 20. The first input clutch assembly 22 is then engaged.

In this second embodiment, reverse is also achieved in the same manner as in the first embodiment, namely by translating the third synchronizer clutch assembly 76 to the right to engage the sixth, driven gear 74 and connect it to the second quill or drive tube 68 and translating the fourth synchronizer clutch assembly 88 to the right to engage the eighth, drive gear 86 and connect it to the second countershaft 60. The second input clutch assembly 62 is then engaged. The direction reversal necessary for reverse is achieved by engagement of the first, driven gear 32 and the sixth, driven gear 68, as noted above.

Figure 2:
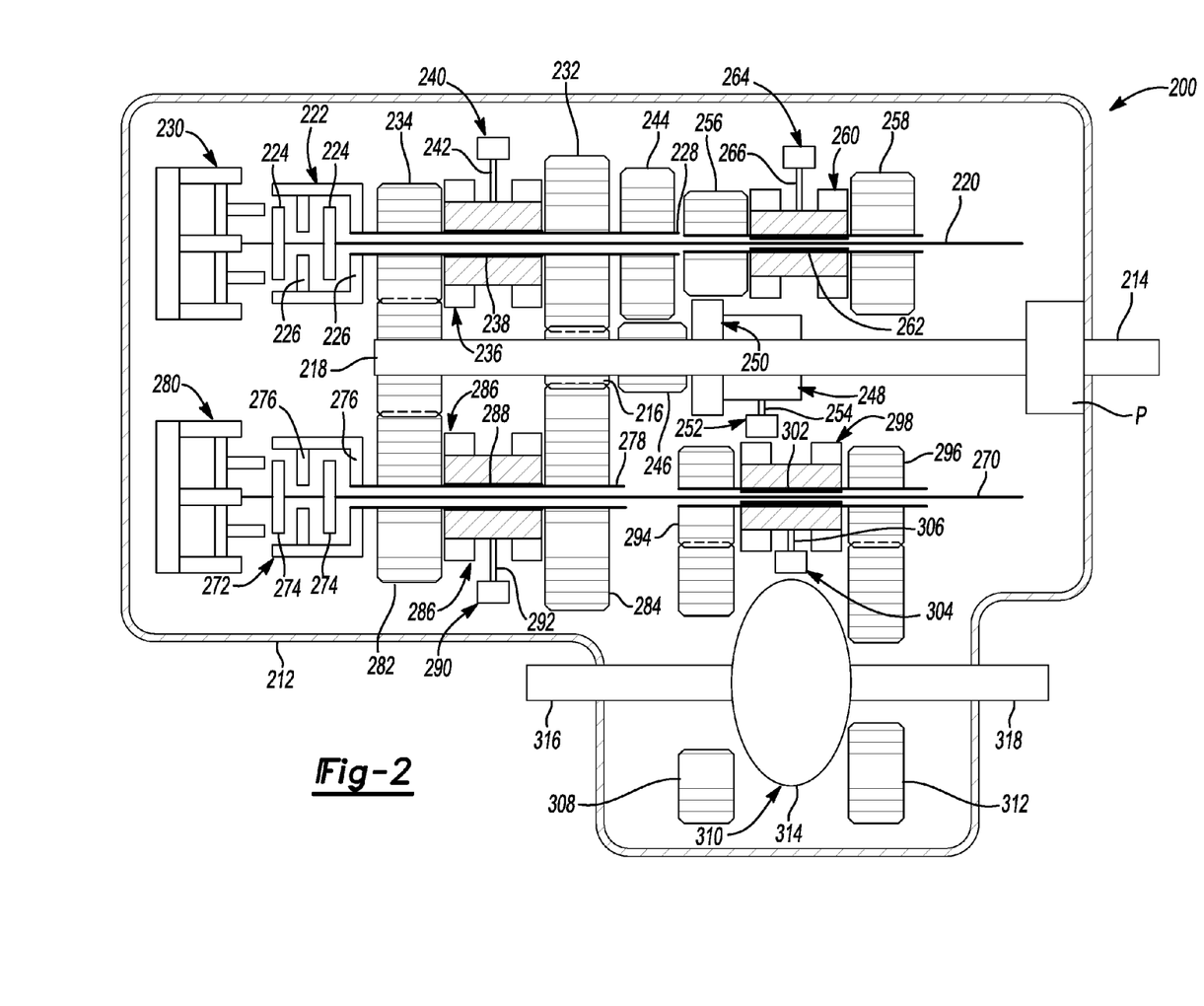
FIG. 2 is a diagrammatic view of a six speed dual clutch transmission according to the present invention.

Referring now to FIG. 2, a six speed dual clutch transmission according to the present invention is illustrated and generally designated by the reference number 200. The six speed dual clutch transmission 200 is similar to the five speed dual clutch transmission 10 in that it includes an input shaft having a pair of gears in constant mesh with gears residing on a pair of quills, a pair of countershafts extending through the pair of quills, a pair of clutches operably disposed between the quills and countershafts and additional pairs of gears on each countershaft that are in constant mesh with gears coupled to a differential. The six speed transmission 200 is distinct in that it includes an additional gear on the input shaft which is in constant mesh with an additional gear on one of the quills and an additional single synchronizer clutch assembly which engages and connects the additional input shaft gear to the input shaft to transfer torque from the input shaft to the associated quill at an additional, sixth speed or gear ratio.

Thus, the six speed dual clutch transmission 200 includes a housing 212 having various bores, openings, flanges and features that receive, locate, support and protect the components of the transmission 200. The housing 212 rotatably supports an input shaft 214 which includes a first, smaller input drive gear 216 and a second, larger input drive gear 218. A hydraulic pump P is secured to the housing 212, driven by the input shaft 214 and supplies pressurized hydraulic or transmission fluid to various components of the transmission 200.

Also rotatably supported in the housing 212 is a first layshaft or countershaft 220 associated with the even numbered gears: second, fourth, sixth and reverse and a second layshaft or countershaft 270 associated with the odd numbered gears: first, third and fifth. The first countershaft 220 and the second countershaft 270 are parallel to and spaced from the input shaft 214. At one end of the first countershaft 220 is a first, wet input clutch assembly 222 having a first plurality of clutch plates or discs 224 coupled to the first countershaft 220 for rotation therewith. Interleaved with the first plurality of clutch plates or discs 224 is a second plurality of clutch plates or discs 226 that are coupled to and rotate with a first quill or drive tube 228. The first wet input clutch assembly 222 also includes a first actuator assembly 230 which may be a hydraulic, electric or pneumatic device or mechanism which selectively compresses and relaxes pressure on the clutch plates or discs 224 and 226 to selectively transfer torque from the first quill or drive tube 228 to the first countershaft 220.

Freely rotatably disposed on the first quill or drive tube 228 is a first, larger driven gear 232 in constant mesh with the first, smaller input drive gear 216 and a second, smaller driven gear 234. Disposed between the first, larger driven gear 232 and the second, smaller driven gear 234 is a first double synchronizer clutch assembly 236. The first synchronizer clutch assembly 236 is rotationally coupled to the first quill or drive tube 228 by a first interengaging male and female spline set 238 and is free to translate axially along the first quill or drive tube 228. A first shift actuator assembly 240 which may be either hydraulic, electric or pneumatic, includes an output member and shift fork assembly 242 that engages and bi-directionally translates the first synchronizer clutch 236.

Proximate the end of the first quill or drive tube 228 opposite the first input clutch assembly 222 and adjacent the first, larger driven gear 232 is an additional driven gear 244 which is secured to and rotates with the first quill or drive tube 228. The additional driven gear 244 is in constant mesh with an additional drive gear 246 which is freely rotatably disposed on the input shaft 214. Adjacent the additional drive gear 246 is an additional or fifth (single) synchronizer clutch assembly 248. The additional or fifth (single) synchronizer clutch assembly 248 is rotationally coupled to the input shaft 214 by an additional or fifth interengaging male and female spline set 250 and is free to translate axially along the input shaft 214. An additional or fifth shift actuator assembly 252 which may be either hydraulic, electric or pneumatic, includes an output member and shift fork assembly 254 that engages and bi-directionally translates the additional or fifth (single) synchronizer clutch assembly 248.

Freely rotatably disposed on the first countershaft 220 is a third, smaller drive gear 256 and a fourth, larger drive gear 258 axially spaced from the third drive gear 256. Disposed between the third, smaller drive gear 256 and the fourth, larger drive gear 258 is a second double synchronizer clutch assembly 260. The second synchronizer clutch assembly 260 is rotationally coupled to the first countershaft 220 by a second interengaging male and female spline set 262 and is free to translate axially along the first countershaft 220. A second shift actuator assembly 264 which may be either hydraulic, electric or pneumatic, includes an output member and shift fork assembly 266 that engages and bi-directionally translates the second synchronizer clutch assembly 260.

At one end of the second countershaft 270 is a second, wet input clutch assembly 272 having a first plurality of clutch plates or discs 274 coupled to the second countershaft 270 for rotation therewith. Interleaved with the first plurality of clutch plates or discs 274 is a second plurality of clutch plates or discs 276 that are coupled to and rotate with a second quill or drive tube 278. The second wet input clutch assembly 272 also includes a second actuator 280 which may be a hydraulic, electric or pneumatic device or mechanism which selectively compresses and relaxes pressure on the clutch plates or discs 274 and 276 to selectively transfer torque from the second quill or drive tube 278 to the second countershaft 270.

Freely rotatably disposed on the second quill or drive tube 278 is a fifth, smaller driven gear 282 in constant mesh with both the second, larger input drive gear 218 and the second, smaller driven gear 234 disposed on the first quill or drive tube 228 and a sixth, larger driven gear 284 in constant mesh with the first, smaller input drive gear 216. Disposed between the fifth, driven gear 282 and the sixth, driven gear 284 is a third double synchronizer clutch assembly 286. The third synchronizer clutch assembly 286 is rotationally coupled to the second quill or drive tube 278 by a third interengaging male and female spline set 288 and is free to translate axially along the second quill or drive tube 278. A third shift actuator assembly 290 which may be either hydraulic, electric or pneumatic, includes an output member and shift fork assembly 292 that engages and bi-directionally translates the third synchronizer clutch assembly 286.

Freely rotatably disposed on the second countershaft 270 is a seventh, larger drive gear 294 and an eighth, smaller drive gear 296 axially spaced from the seventh drive gear 294. Disposed between the seventh, larger drive gear 294 and the eighth, smaller drive gear 296 is a fourth double synchronizer clutch assembly 298. The fourth synchronizer clutch 298 is rotationally coupled to the second countershaft 270 by a fourth interengaging male and female spline set 302 and is free to translate axially along the second countershaft 270. A fourth shift actuator assembly 304 which may be either hydraulic, electric or pneumatic, includes an output member and shift fork assembly 306 that engages and bi-directionally translates the fourth synchronizer clutch assembly 298.

The third, smaller drive gear 256 and the seventh, larger drive gear 294 both are in constant mesh with and drive a first output or ring gear 308 that is associated with and is an input member to a conventional differential assembly 310. Similarly, the fourth, larger drive gear 258 and the eighth, smaller drive gear 296 both are in constant mesh with and drive a second output or ring gear 312 that is also associated with and is an input member to the differential assembly 310. The differential assembly 310 preferably includes a caged, four bevel gear assembly 314. Two side bevel gears of the bevel gear assembly 314 are coupled to a respective pair of axles or output shafts 316 and 318.

Operation of the six speed dual clutch transmission 200 is similar to that of the two embodiments of the five speed dual clutch transmission of the present invention in that torque transfer through the transmission 200 from the input shaft 214 to the differential assembly 310 always involves the activation and engagement of two of the synchronizer clutch assemblies 236, 248, 260, 286 and 298, followed by activation and engagement of one of the wet input clutches 222 or 272. For example, first gear is provided by translating the third synchronizer clutch assembly 286 to the left and engaging the fifth, driven gear 282 and translating the fourth synchronizer clutch assembly 298 to the right and engaging the eighth drive gear 296, followed by engagement of the second wet input clutch 272.

Second gear is provided by translating the first synchronizer clutch assembly 236 to the right and engaging the first, driven gear 232 and translating the second synchronizer clutch assembly 260 to the right and engaging the fourth drive gear 258, followed by engagement of the first wet input clutch 222. Third gear is provided by translating the third synchronizer clutch assembly 286 to the right and engaging the sixth, driven gear 284 and translating the fourth synchronizer clutch assembly 298 to the right and engaging the eighth drive gear 296, followed by engagement of the second wet input clutch 272.

Fourth gear is provided by translating the first synchronizer clutch assembly 236 to the right and engaging the first, driven gear 232 and translating the second synchronizer clutch assembly 260 to the left and engaging the third drive gear 256, followed by engagement of the first wet input clutch 222. Fifth gear is provided by translating the third synchronizer clutch assembly 286 to the right and engaging the sixth, driven gear 284 and translating the fourth synchronizer clutch assembly 298 to the left and engaging the seventh drive gear 294, followed by engagement of the second wet input clutch 272.

Sixth gear is provided by translating the additional (fifth) single synchronizer clutch assembly 248 to the left and engaging the additional drive gear 246 and translating the second synchronizer clutch assembly 260 to the left and engaging the third drive gear 256, followed by engagement of the first wet input clutch 222. Reverse is achieved by translating the first synchronizer clutch assembly 236 to the left and engaging the second, smaller driven gear 234 and translating the second synchronizer clutch assembly 260 to the right and engaging the fourth drive gear 258, followed by engagement of the first wet input clutch 222. The direction reversal necessary for reverse is achieved by drive from the second, larger input drive gear 218, through the fifth, smaller driven gear 282, to the second, smaller driven gear 234.

Figure 3:
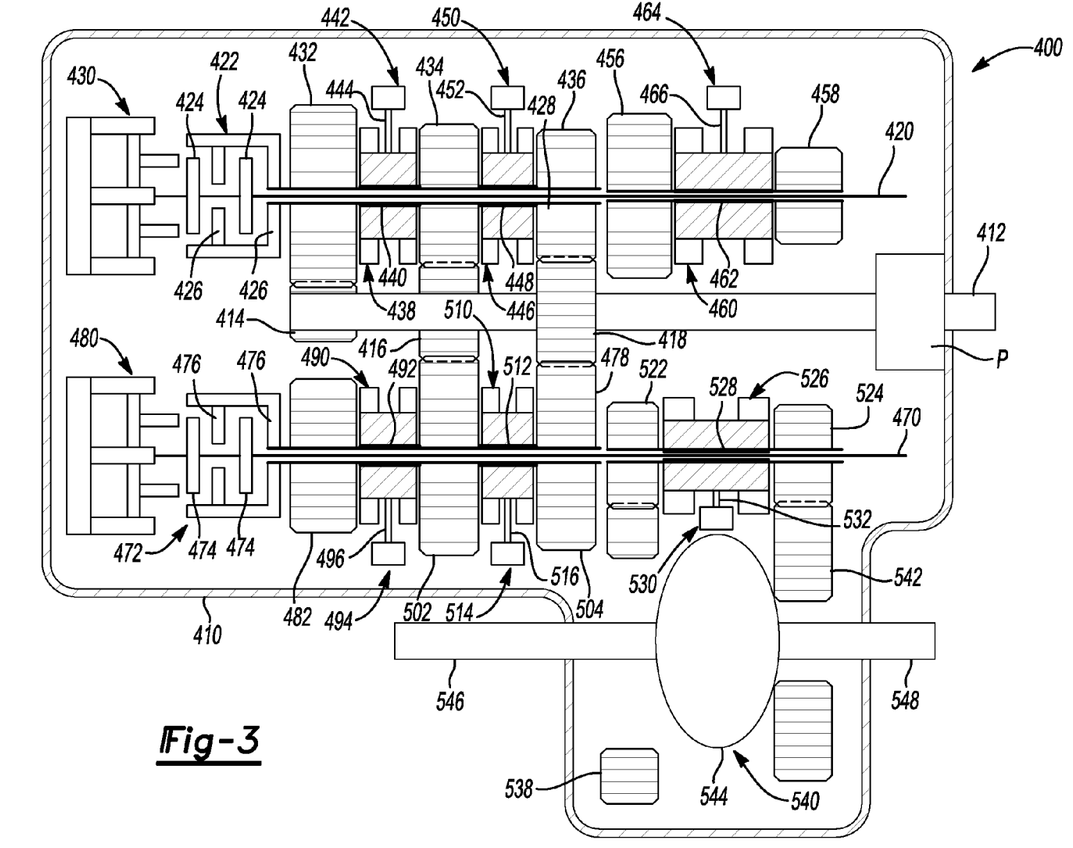
FIG. 3 is a diagrammatic view of a seven speed dual clutch transmission according to the present invention.

Referring now to FIG. 3, a seven speed dual clutch transmission according to the present invention is illustrated and generally designated by the reference number 400. The seven speed dual clutch transmission 400 is similar to the five and six speed dual clutch transmissions 10 and 200 in that it includes an input shaft having gears in constant mesh with gears residing on a pair of parallel quills, a pair of countershafts extending through the pair of quills, a pair of clutches operably disposed between the quills and countershafts and additional pairs of gears on each countershaft that are in constant mesh with gears coupled to a differential. The seven speed transmission 400 is distinct in that it includes an additional gear on the input shaft which is in constant mesh with an additional gear on each of the quills and an additional single synchronizer clutch assembly on each quill which engages and connects one of the three gears to the quill to transfer torque from the input shaft to the associated quill.

The seven speed dual clutch transmission 400 includes a housing 410 having various bores, openings, flanges and features that receive, locate, support and protect the components of the transmission 400. The housing 410 rotatably supports an input shaft 412 which includes a first, smaller input drive gear 414, a second, larger input drive gear 416 and a third, larger input drive gear 418. A hydraulic pump P is secured to the housing 410, driven by the input shaft 412 and supplies pressurized hydraulic or transmission fluid to various components of the transmission 400.

Also rotatably supported in the housing 412 is a first layshaft or countershaft 420 associated with the odd numbered gears: first, third, fifth and seventh and a second layshaft or countershaft 470 associated with the even numbered gears: second, fourth, sixth and reverse. The first countershaft 420 and the second countershaft 470 are parallel to and spaced from the input shaft 412. At one end of the first countershaft 420 is a first, wet input clutch assembly 422 having a first plurality of clutch plates or discs 424 coupled to the first countershaft 420 for rotation therewith. Interleaved with the first plurality of clutch plates or discs 424 is a second plurality of clutch plates or discs 426 that are coupled to and rotate with a first quill or drive tube 428. The first wet clutch assembly 422 also includes a first actuator 430 which may be a hydraulic, electric or pneumatic device or mechanism which selectively compresses and relaxes pressure on the clutch plates or discs 424 and 426 to selectively transfer torque from the first quill or drive tube 428 to the first countershaft 420.

Freely rotatably disposed on the first quill or drive tube 428 is a first, larger driven gear 432 in constant mesh with the first, smaller input drive gear 414, a second, smaller driven gear 434 in constant mesh with the second, larger input gear 416 and a third, smaller driven gear 436 in constant mesh with a third, larger drive gear 418. Disposed adjacent the first, larger driven gear 432 is a first, single synchronizer clutch assembly 438. The first, single synchronizer clutch assembly 438 is rotationally coupled to the first quill or drive tube 428 by a first interengaging male and female spline set 440 and is free to translate axially along the first quill or drive tube 428. A first shift actuator assembly 442 which may be either hydraulic, electric or pneumatic, includes an output member and shift fork assembly 444 that engages and bi-directionally translates the first synchronizer clutch 438. When translated to the left from a neutral (right) position, the first, single synchronizer clutch assembly 438 (and the other single synchronizer clutch assembly identified and described below) first synchronizes the speed of the adjacent gear, such as the first, larger driven gear 432 to the left, and then positively couples the synchronized gear to the associated quill or drive tube, such as the first quill or drive tube 428.

Disposed between the second, smaller driven gear 434 and the third, smaller driven gear 436 is a second, double synchronizer clutch assembly 446. The second synchronizer clutch assembly 446 is rotationally coupled to the first quill or drive tube 428 by a second interengaging male and female spline set 448 and is free to translate axially along the first quill or drive tube 428. A first shift actuator assembly 450 which may be either hydraulic, electric or pneumatic, includes an output member and shift fork assembly 452 that engages and bi-directionally translates the second synchronizer clutch assembly 446. When translated to the right or left from a neutral center position, the second synchronizer clutch assembly 446 (and the three other double synchronizer clutch assemblies identified and described below) first synchronizes the speed of the adjacent gear, either the gear 434 to the left or the gear 436 to the right, and then positively couples the synchronized gear to the associated quill or drive tube, such as the first quill or drive tube 428.

Freely rotatably disposed on the first countershaft 420 is a fourth, larger drive gear 456 and a fifth, smaller drive gear 458 axially spaced from the fourth drive gear 456. Disposed between the fourth, larger drive gear 456 and the fifth, smaller drive gear 458 is a third, double synchronizer clutch assembly 460. The third, double synchronizer clutch assembly 460 is rotationally coupled to the first countershaft 420 by a third interengaging male and female spline set 462 and is free to translate axially along the first countershaft 420. A third shift actuator assembly 464 which may be either hydraulic, electric or pneumatic, includes an output member and shift fork assembly 466 that engages and bi-directionally translates the second synchronizer clutch assembly 460.

At one end of the second countershaft 470 is a second, wet input clutch assembly 472 having a first plurality of clutch plates or discs 474 coupled to the second countershaft 470 for rotation therewith. Interleaved with the first plurality of clutch plates or discs 474 is a second plurality of clutch plates or discs 476 that are coupled to and rotate with a second quill or drive tube 478. The second wet input clutch assembly 472 also includes a second actuator 480 which may be a hydraulic, electric or pneumatic device or mechanism which selectively compresses and relaxes pressure on the clutch plates or discs 474 and 476 to selectively transfer torque from the second quill or drive tube 478 to the second countershaft 470.

Freely rotatably disposed on the second quill or drive tube 478 is a sixth, driven gear 482 which is in constant mesh with the first, larger driven gear 432. Disposed adjacent the sixth, driven gear 482 is a fourth, single synchronizer clutch assembly 490. The fourth, single synchronizer clutch assembly 490 is rotationally coupled to the second quill or drive tube 478 by a fourth interengaging male and female spline set 492 and is free to translate axially along the second quill or drive tube 478. A fourth shift actuator assembly 494 which may be either hydraulic, electric or pneumatic, includes an output member and shift fork assembly 496 that engages and bi-directionally translates the fourth, single synchronizer clutch 490.

Also freely rotatably disposed on the second quill or drive tube 478 is a seventh, larger driven gear 502 in constant mesh with the second, larger input drive gear 416 and a eighth, larger driven gear 504 in constant mesh with the third, larger input drive gear 418. Disposed between the seventh, driven gear 502 and the eighth, driven gear 504 is a fifth double synchronizer clutch assembly 510. The fifth synchronizer clutch assembly 510 is rotationally coupled to the second quill or drive tube 478 by a fifth interengaging male and female spline set 512 and is free to translate axially along the second quill or drive tube 478. A fifth shift actuator assembly 514 which may be either hydraulic, electric or pneumatic, includes an output member and shift fork assembly 516 that engages and bi-directionally translates the fifth synchronizer clutch assembly 510.

Freely rotatably disposed on the second countershaft 470 is a ninth, larger drive gear 522 and an tenth, smaller drive gear 524 axially spaced from the ninth, larger drive gear 522. Disposed between the ninth, larger drive gear 522 and the tenth, smaller drive gear 524 is a sixth, double synchronizer clutch assembly 526. The sixth, double synchronizer clutch assembly 526 is rotationally coupled to the second countershaft 470 by a sixth interengaging male and female spline set 528 and is free to translate axially along the second countershaft 470. A sixth shift actuator assembly 530 which may be either hydraulic, electric or pneumatic, includes an output member and shift fork assembly 532 that engages and bi-directionally translates the sixth synchronizer clutch assembly 526.

The fourth, larger drive gear 456 and the ninth, larger drive gear 522 both are in constant mesh with and drive a first output or ring gear 538 that is associated with and is an input member to a conventional differential assembly 540. Similarly, the fifth, smaller drive gear 458 and the tenth, smaller drive gear 524 both are in constant mesh with and drive a second output or ring gear 542 that is also associated with and is an input member to the differential assembly 540. The differential assembly 540 preferably includes a caged, four bevel gear assembly 544. Two side bevel gears of the bevel gear assembly 544 are coupled to a respective pair of axles or output shafts 546 and 548.

Operation of the seven speed dual clutch transmission 400 is similar to that of the three above embodiments of the wet dual clutch transmission of the present invention in that torque transfer through the transmission 400 from the input shaft 412 to the differential assembly 540 always involves the activation and engagement of two of the synchronizer clutch assemblies 438, 446, 460, 490, 510 and 526, followed by activation and engagement of one of the wet input clutches 422 or 472. For example, first gear is provided by translating the first synchronizer clutch assembly 438 to the left and engaging the first driven gear 432 and translating the third synchronizer clutch assembly 460 to the right and engaging the sixth drive gear 458, followed by engagement of the first wet input clutch 422. Second gear is provided by translating the fifth synchronizer clutch assembly 510 to the left and engaging the seventh driven gear 502 and translating the sixth synchronizer clutch assembly 526 to the right to engage the tenth drive gear 524, followed by engagement of the second wet input clutch 472.

Third gear is provided by translating the first synchronizer clutch assembly 438 to the left and engaging the first driven gear 432 and translating the third synchronizer clutch assembly 460 to the left and engaging the fifth drive gear 456, followed by engagement of the first wet input clutch 422. Fourth gear is provided by translating the fifth synchronizer clutch assembly 510 to the left and engaging the seventh driven gear 502 and translating the sixth synchronizer clutch assembly 526 to the left to engage the ninth drive gear 522, followed by engagement of the second wet input clutch 472. Fifth gear is provided by translating the second synchronizer clutch assembly 446 to the left and engaging the second driven gear 434 and translating the third synchronizer clutch assembly 460 to the left and engaging the fifth drive gear 456, followed by engagement of the first wet input clutch 422. Sixth gear is provided by translating the fifth synchronizer clutch assembly 510 to the right and engaging the eighth driven gear 504 and translating the sixth synchronizer clutch assembly 526 to the left to engage the ninth drive gear 522, followed by engagement of the second wet input clutch 472. Seventh gear is provided by translating the second synchronizer clutch assembly 446 to the right and engaging the third driven gear 436 and translating the third synchronizer clutch assembly 460 to the left and engaging the fifth drive gear 456, followed by engagement of the first wet input clutch 422. Reverse is achieved by translating the fourth synchronizer clutch assembly 490 to the left and engaging the sixth driven gear 482 and translating the sixth synchronizer clutch assembly 526 to the right to engage the tenth drive gear 524, followed by engagement of the second wet input clutch 472. The direction reversal necessary for reverse is achieved by drive from the first, smaller input drive gear 414, through the first, larger driven gear 432, to the sixth, smaller driven gear 482.

The wet dual clutch transmissions 10, 200 and 400 according to the present invention provide many features and benefits. First of all, in the five speed dual clutch transmission 10, there are only four gear planes and the in the six speed transmission 200 and the seven speed transmission 400 there are only five gear planes. Additionally, the input clutches are disposed on the axes of the quills and countershafts. All of these features permit a more axially compact transmission. In fact, the nominal axial distance between the input shaft and the center of the differential is smaller than in most dual clutch transmission configurations.

The solid input shaft improves hydraulic pump packaging and provides the potential for improved hybridization. The gear sets between the input shaft and the gears on the quills reduce quill, clutch and countershaft speeds and thus reduce spin losses in both the gears and the input clutches relative to conventional dual clutch transmission configurations. Finally, spin losses are further reduced because the open (inactive) input clutch does not spin when not in use, unless gear preselection has occurred.

The description of the invention is merely exemplary in nature and variations that do not depart from the gist of the invention are intended to be within the scope of the invention. Such variations are not to be regarded as a departure from the spirit and scope of the invention.

What is claimed is:

1. A dual clutch transmission comprising, in combination,
an input shaft defining an axis and having a pair of drive gears coupled thereto and a third drive gear freely rotatably disposed thereon,
a first quill and a second quill defining a pair of axes parallel to and spaced from said input shaft axis,
a first pair of gears freely rotatably disposed upon said first quill and each engaged by a respective one of said pair of drive gears on said input shaft;
a first synchronizer clutch disposed between said first pair of gears on said first quill;
a first countershaft extending through said first quill;
a first clutch operably disposed between said first quill and said first countershaft;
a second pair of gears freely rotatably disposed on said first countershaft;
a second synchronizer clutch disposed between said second pair of gears on said first countershaft;
a second countershaft extending through said second quill;
a second clutch operably disposed between said second quill and said second countershaft;
a third pair of gears freely rotatably disposed upon said second quill and each engaged by a respective one of said pair of drive gears on said input shaft;
a third synchronizer clutch disposed between said third pair of gears on said second quill;
a fourth pair of gears freely rotatably disposed upon said second countershaft;
a fourth synchronizer clutch disposed between said fourth pair of gears on said second countershaft;
a first single gear coupled to said first quill for rotation therewith and engaged by said third drive gear on said input shaft;
a fifth synchronizer clutch disposed adjacent said third drive gear on said input shaft; and
a pair of output gears, one of said pair of output gears engaged by one of each of said second and said fourth pair of gears.

2. The dual clutch transmission of claim 1 wherein said input clutches are wet.

3. The dual clutch transmission of claim 1 further including a differential assembly disposed between said pair of output gears, said differential assembly including a pair of output shafts.

4. The dual clutch transmission of claim 3 wherein said pair of output shafts are parallel to said input shaft.

5. The dual clutch transmission of claim 1 further including actuator and shift fork assemblies associated with each of said synchronizer clutches.

6. The dual clutch transmission of claim 1 wherein said fifth synchronizer clutch is a single synchronizer clutch cooperating with said third drive gear on said input shaft.

7. A dual clutch transmission comprising, in combination,
an input shaft having two drive gears coupled thereto and a third drive gear freely rotatably disposed thereon,
a first quill and a second quill parallel to and spaced from said input shaft,
a first pair of gears freely rotatably disposed upon said first quill and each in constant mesh with a respective one of said two drive gears coupled to said input shaft;
a first synchronizer clutch disposed between said first pair of gears on said first quill;
a first countershaft extending through said first quill;
a first wet clutch operably disposed between said first quill and said first countershaft;
a second pair of gears freely rotatably disposed on said first countershaft;
a second synchronizer clutch disposed between said second pair of gears on said first countershaft;
a second countershaft extending through said second quill;
a second wet clutch operably disposed between said second quill and said second countershaft;
a third pair of gears freely rotatably disposed upon said second quill and each in constant mesh with one of said two drive gears coupled to said input shaft;
a third synchronizer clutch disposed between said third pair of gears on said second quill;
a fourth pair of gears freely rotatably disposed upon said second countershaft;
a fourth synchronizer clutch disposed between said fourth pair of gears on said second countershaft;
a first single gear coupled to said first quill for rotation therewith and engaged by said third drive gear on said input shaft;
a fifth synchronizer clutch disposed adjacent said third drive gear on said input shaft; and
a pair of output gears, one of said pair of output gears in constant mesh with one of each of said second and said fourth pair of gears.

8. The dual clutch transmission of claim 7 further including a differential assembly disposed between said pair of output gears, said differential assembly including a pair of output shafts.

9. The dual clutch transmission of claim 8 wherein said pair of output shafts are parallel to said input shaft.

10. The dual clutch transmission of claim 7 further including actuator and shift fork assemblies associated with each of said synchronizer clutches.

11. The dual clutch transmission of claim 7 further including a hydraulic pump driven by said input shaft.

12. The dual clutch transmission of claim 7 wherein said fifth synchronizer clutch is a single synchronizer clutch cooperating with said third drive gear on said input shaft.

13. A dual clutch transmission comprising, in combination, an input shaft having two drive gears coupled thereto and a third drive gear freely rotatably disposed thereon, a first drive tube and a second drive tube parallel to and spaced from said input shaft, a first pair of gears freely rotatably disposed upon said first drive tube and in constant mesh with a respective one of said two drive gears coupled to said input shaft;

a first synchronizer clutch disposed between said first pair of gears on said first drive tube;

a first countershaft extending through said first drive tube;

a first clutch operably disposed between said first drive tube and said first countershaft;

a second pair of gears freely rotatably disposed on said first countershaft;

a second synchronizer clutch disposed between said second pair of gears on said first countershaft;

a second countershaft extending through said second drive tube;

a second clutch operably disposed between said second drive tube and said second countershaft;

a third pair of gears freely rotatably disposed upon said second drive tube and each in constant mesh with one of said two gears coupled to said input shaft;

a third synchronizer clutch disposed between said third pair of gears on said second drive tube;

a fourth pair of gears freely rotatably disposed upon said second countershaft;

a fourth synchronizer clutch disposed between said fourth pair of gears on said second countershaft;

a first single gear coupled to said first quill for rotation therewith and engaged by said third gear on said input shaft;

a fifth synchronizer clutch disposed adjacent said third gear on said input shaft; and a pair of output gears, one of said pair of output gears in constant mesh with one of each of said second and said fourth pair of gears.

14. The dual clutch transmission of claim 13 further including a differential assembly disposed between said pair of output gears, said differential assembly including a pair of output shafts.

15. The dual clutch transmission of claim 13 further including actuator and shift fork assemblies associated with each of said synchronizer clutches.

16. The dual clutch transmission of claim 13 wherein said fifth synchronizer clutch is a single synchronizer clutch cooperating with said third drive gear on said input shaft.

17. The dual clutch transmission of claim 13 further including a hydraulic pump coupled to and driven by said input shaft.

* * * * *